US010062105B2

(12) United States Patent
Villanueva et al.

(10) Patent No.: US 10,062,105 B2
(45) Date of Patent: Aug. 28, 2018

(54) STYLUS

(71) Applicant: NCR Corporation, Duluth, GA (US)

(72) Inventors: Aimie Villanueva, Cebu (PH); Lucman Abdulrachman, Minglanilla (PH)

(73) Assignee: NCR Corporation, Atlanta, GA (US)

( * ) Notice: Subject to any disclaimer, the term of this patent is extended or adjusted under 35 U.S.C. 154(b) by 426 days.

(21) Appl. No.: 14/838,688

(22) Filed: Aug. 28, 2015

(65) Prior Publication Data

US 2017/0061526 A1   Mar. 2, 2017

(51) Int. Cl.
| | |
|---|---|
| *G06F 3/0354* | (2013.01) |
| *G06Q 30/06* | (2012.01) |
| *G06Q 50/12* | (2012.01) |
| *G06Q 20/34* | (2012.01) |
| *G06Q 20/20* | (2012.01) |

(52) U.S. Cl.
CPC ..... *G06Q 30/0641* (2013.01); *G06F 3/03545* (2013.01); *G06Q 20/208* (2013.01); *G06Q 20/34* (2013.01); *G06Q 50/12* (2013.01)

(58) Field of Classification Search
CPC .. G06Q 30/0641; G06Q 20/208; G06Q 20/34; G06F 3/0317; G06F 3/0362
USPC .......................................................... 705/15
See application file for complete search history.

(56) References Cited

U.S. PATENT DOCUMENTS

| | | | | |
|---|---|---|---|---|
| 5,574,804 A | * | 11/1996 | Olschafskie | G06K 9/228 235/462.49 |
| 6,956,564 B1 | * | 10/2005 | Williams | G06F 3/03545 178/18.01 |
| 2009/0091530 A1 | * | 4/2009 | Yoshida | G06F 3/002 345/156 |
| 2009/0158446 A1 | * | 6/2009 | Harris | G06F 1/1613 726/35 |
| 2014/0347328 A1 | * | 11/2014 | Edgecomb | G06F 3/04855 345/179 |
| 2015/0023718 A1 | * | 1/2015 | Gardner | B43K 8/003 401/195 |

* cited by examiner

*Primary Examiner* — Hajime S Rojas
*Assistant Examiner* — Joseph M Mutschler
(74) *Attorney, Agent, or Firm* — Schwegman, Lundberg & Woessner

(57) ABSTRACT

A stylus may include a body, a display, a scanner module, and a control knob. The body may have an outer surface and a first and second end. The outer surface may define a volume that may contain a processor and a memory. The display may be proximate the outer surface and may be in electrical communication with the processor. The scanner module may be in electrical communication with the processor and may be proximate the first end. The scanner module may include a scanner. The control knob may be in electrical communication with the processor and may be proximate either the first or second end. The control knob may be operative to cycle through and select digital menu options that may be displayed on the display.

8 Claims, 4 Drawing Sheets

STYLUS

BACKGROUND

In a typical restaurant setting customers arrive and are seated by a host. Once seated and after reviewing menus, servers write down the customers' order on small sheets of paper. The sheets of paper are given to kitchen staff that then prepare the orders. The small sheets of paper are then discarded. When the customers have finished their meals a bill is printed and brought to the table. When the customers pay with a credit or debit cards, multiple receipts are brought to the customers for signing and for the restaurant's records. After payment the customers leave the restaurant.

SUMMARY

A stylus may include a body, a display, a scanner module, and a control knob. The body may have an outer surface and a first and second end. The outer surface may define a volume that may contain a processor and a memory. The display may be proximate the outer surface and may be in electrical communication with the processor. The scanner module may be in electrical communication with the processor and may be proximate the first end. The scanner module may include a scanner. The control knob may be in electrical communication with the processor and may be proximate either the first or second end. The control knob may be operative to cycle through and select digital menu options that may be displayed on the display.

BRIEF DESCRIPTION OF THE FIGURES

The above-mentioned and other features and advantages of embodiments disclosed herein, and the manner of attaining them, will become more apparent and the disclosure itself will be better understood by reference to the following description of example embodiments taken in conjunction with the accompanying drawings, wherein.

Corresponding reference characters indicate corresponding parts throughout the several views. The examples set out herein illustrate example embodiments, and such examples are not to be construed as limiting the scope of the disclosure any manner.

DETAILED DESCRIPTION

Figure 1:
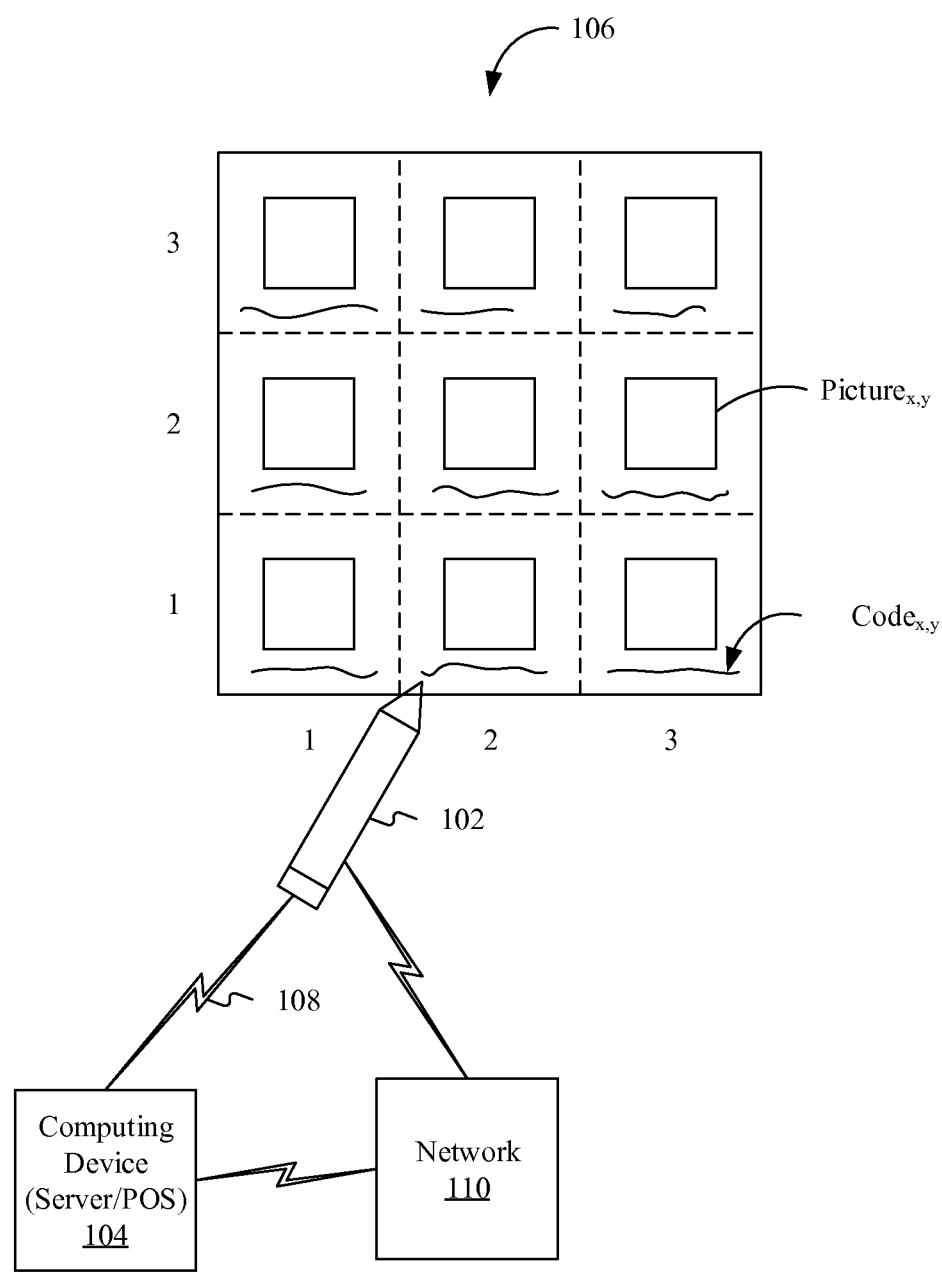
FIG. 1 shows an operating environment for using a stylus consistent with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

In order to minimize paper consumption and order confusion a stylus may be used in conjunction with a printed menu. The stylus may allow a server to take an order in a paperless manner. In addition, the customer may use the stylus and printed menu to enter an order without the need for a server.

Consistent with embodiments disclosed herein, a stylus may include a body, a display, a scanner module, and a control knob. The body may have an outer surface and a first and second end. The outer surface may define a volume that may contain electrical and other components. For example, a processor and a memory may be located within the volume. The display may be proximate the outer surface and may be in electrical communication with the processor. The scanner module may be in electrical communication with the processor and may be proximate the first end. The scanner module may include a scanner. The control knob may be in electrical communication with the processor and may be proximate either the first or second end. The control knob may be operative to cycle through and select digital menu options that may be displayed on the display.

The stylus may include a writing instrument. For example, the scanner module may include a writing pen or a pencil.

The scanner module may be connected to the body via a USB connection and magnets. For example, a USB connection may be used to electrically connect the processor to the scanner module. The scanner module or the body may include a magnet. The magnet may attach to a metal portion of the body or scanner module, respectively. In addition, the scanner module may include a magnification lens. The magnification lens may be positioned between the scanner and, when in use, micro-printed text printed on a printed menu. The magnification lens may magnify light that may impinge on the scanner.

The scanner may be configured to scan at least one of a barcode, an ink visible in either a UV or an IR spectrum, a Quick Response (QR) code printed on a printed menu, or a Radio Frequency Identification (RFID) tag embedded within the printed menu.

The stylus may also include a radio transponder device. The radio transponder device may be located within the volume. The radio transponder device may be configured to transmit signals with data encoded therein via a Wi-Fi or Bluetooth connection.

The stylus may include a magnetic stripe reader module that may be in electrical communication with the processor. The magnetic stripe reader module may include a magnetic stripe reader. The magnetic stripe reader may be fashioned in a shape of a clip. The clip may be arranged to secure the stylus to an article of clothing.

The memory of the stylus may store a plurality of entries. Each of the plurality of entries may contain information regarding a menu item on a printed menu. For example, the information regarding the menu item may include a price of the menu item, a description of the menu item, and a product identifier.

The processor of the stylus may be operative to receive, from the scanner, coordinates that may correspond to a location on a printed menu. In addition, the processor may be operative to retrieve an entry that may be associated with a menu item associated with the location on the printed menu using the coordinates. For example, the coordinates may act as a pointer to the entry stored in the memory of the stylus. The display may be operative to display the entry associated with the menu item.

Consistent with embodiments disclosed herein, a method may comprise receiving, by a stylus comprising a processor and a memory, coordinates that may correspond to a location on a printed menu; retrieving, from the memory of the stylus, an entry that may be associated with a menu item that may be associated in the memory with the coordinates; and displaying, on a display of the stylus, information that may be associated with the entry that may be associated with the menu item.

Receiving the coordinates may include scanning a portion of the printed menu to read a code. The code may include the coordinates for the location on the printed menu. The code may include at least one of a Quick Response (QR) code, a barcode, a Radio Frequency Identification (RFID) tag, and micro-printing. In addition, receiving the coordinates may include receiving an image from a scanner module that may include a scanner.

The information associated with the entry may include a price of the menu item, a description of the menu item, and a product identifier. The method may further include transmitting, by the stylus, the product identifier to a computing device. The computing device may be remote from the stylus. In addition, the product identifier may be transmitted via a radio transponder device of the stylus.

The method may further comprise receiving, at the stylus, payment information. The payment information may include credit or debit card information. The payment information may be received by one of a magnetic stripe reader module of the stylus, a manual entry into the stylus, a wireless transmission, and capturing an image of a credit or debit card and reading the data thereon.

Consistent with embodiments disclosed herein, a method may include receiving, at a point of sale terminal comprising a processor and a memory, a plurality of coordinates from a stylus, each of the plurality of coordinates may be associated with a menu item that may be stored in the memory; retrieving, by the point of sale terminal, a plurality of entries that may be associated with the plurality of coordinates from the memory; transmitting, by the point of sale terminal, the plurality of entries that may be associated with the plurality of coordinates to the stylus; and receiving, by the point of sale terminal, a confirmation of a sale of the menu items that may be associated with each of the plurality of coordinates. The point of sale terminal and the stylus may communicate via a Wi-Fi or Bluetooth connection.

FIG. 1 shows an operating environment 100 for using a stylus 102 consistent with the disclosure. Operating environment 100 may include stylus 102, a computing device 104, and a printed menu 106. Stylus 102 may communicate with computing device 104 directly as shown by link 108 or via network 110. Link 108 may be a wireless connection or a wired connection. Communication via network 110 may be wireless, wired, or a combination of both. Computing device 104 may be a point of sale terminal or a server. Computing device 104 be implemented using a personal computer, a network computer, etc.

Printed menu 106 may be divided using a coordinate system. For example, as shown in FIG. 1 various items may be printed on printed menu 106 in a grid like fashion. The grid may operate to define a coordinate system that may be used to specify a location of a menu item on printed menu 106. For instance, a lower left corner of the printed menu 106 may be defined as an origin. The grid spacing may be based on units of measurement or other arbitrarily defined basis. For example, the various items depicted on printed menu 106 may be arranged in a grid fashion. The non-limiting example shown in FIG. 1 shows nine items arranged in a 3×3 grid. Thus, each item may represent a unit of measurement.

The coordinates for an item may define the item's location on printed menu 106. As shown in FIG. 1, each of the nine items may have coordinates corresponding to a location of the item on the grid. For example, a picture of an item located at the center of printed menu 106 may have coordinates 2,2. Stated another way, an item a user may wish to purchase may be depicted as $picture_{2,2}$ on printed menu.

Each of the various items printed on printed menu 106 may have a code (e.g., $code_{x,y}$). The code may include the coordinates of the picture printed on printed menu 106. Non-limiting examples of the code may include a barcode or Quick Response (QR) code printed on printed menu 106. The code may be printed with an ink that is visible or invisible to a human eye. For example, the code may be printed with an ink that is visible in the ultraviolet (UV) or infrared (IR) spectrums. During use, stylus 102 may shine a UV or IR light on the code to illuminate the code. In addition, the code may be embedded within printed menu via a Radio Frequency Identification (RFID) tag.

During use stylus 102 may use the coordinates extracted from the code to identify the item. For example, the coordinates may act as a pointer to a location in a database that may contain information about the item. The database may be stored locally on stylus 102 or remotely. For example, computing device 104 may receive the coordinates from stylus 102 and may access the database.

Figure 2A:
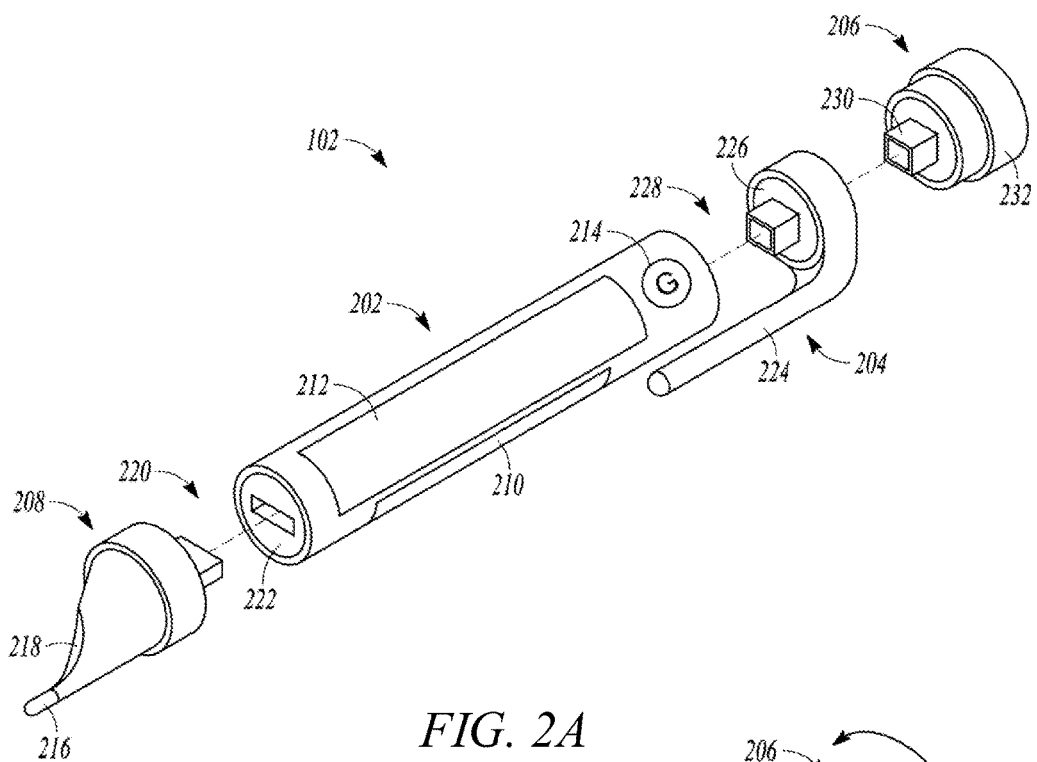
FIGS. 2A and 2B show an example stylus consistent with embodiments disclosed herein.
Figure 2B:
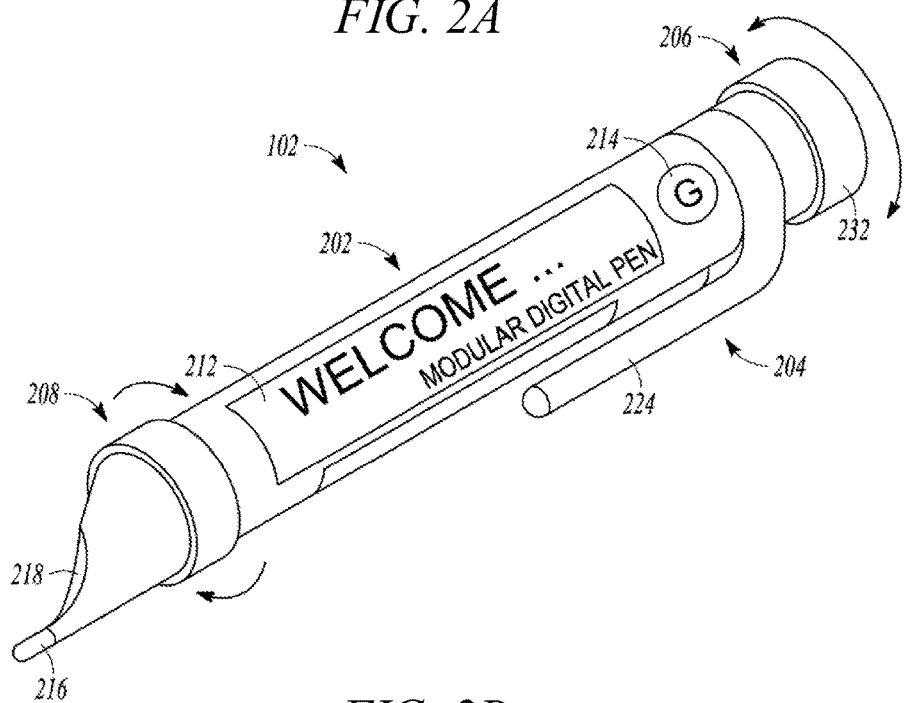

FIGS. 2A and 2B show an example of stylus 102 consistent with embodiments disclosed herein. Stylus 102 may include a body 202, a magnetic stripe reader module 204, a control knob 206, and a scanner module 208. Body 202 may include an outer surface and a first and second end that define a volume. A processor, a memory, and a radio transponder device, described below with regard to FIG. 3, may be located with the volume defined by body 202. In addition, body 202 may include a battery compartment 210. As shown in FIGS. 2A and 2B, the various components of stylus 102 may be modular. Consistent with embodiments disclosed herein, various components may be omitted and other components may be added.

A display 212 may be located proximate the outer surface. For example, a portion of the outer surface may be removed and display 212 may be recessed into the outer surface. Body 202 may also include a power button 214. Non-limiting examples of display 212 include a liquid crystal display (LCD) or a light emitting diode (LED) display.

Scanner module 208 may include a scanner located within scanner module 208 and a writing instrument 216. For example, scanner module 208 may include an ink pen or a pencil. Scanner module 208 may also include a magnification lens 218. During use, magnification lens 218 may be positioned between the scanner and printed menu 106. For example, during use, magnification lens 218 may be positioned between the scanner and micro-printed text printed on printed menu 106. Magnification lens 218 may magnify light impinging on the scanner.

Scanner module 208 may connect to body 202 via a USB connection 220. A magnet 222 may provide additional support to secure scanner module 208 to body 202. USB connection 220 may allow the scanner and other components that may be housed within scanner module 208 to be in electrical communication with the processor located within body 202.

USB connection 220 may allow stylus 102 to connect with computing device 104. While connected to computing device 104, USB connection 220 may allow for programing and other data transfer between stylus 102 and computing device 104. For example, a server may take an order using stylus 102 and may connect stylus 102 to computing device 104 in order to transfer the order to computing device 104. In addition, USB connection 220 may allow batteries located within body 202 to be recharged. The transfer of data between stylus 102 and computing device 104 via USB connection 220 may be in addition to or separate from data transfer that may occur via a wireless connection such as Wi-Fi or Bluetooth. For example, an order may initially be transferred from stylus 102 to computing device 104 as a signal with encoded data via a Bluetooth connection. Later, stylus 102 may be connected to computing device 104 via USB connection 220 and the wireless transmission may be confirmed.

Magnetic stripe reader module 204 may include a magnetic stripe reader. The magnetic stripe reader may be used to swipe credit or debit cards. Magnetic stripe reader module 204 may be shaped into a clip 224. Clip 224 may allow stylus 102 to be clipped to an article of clothing. For example, clip 224 may allow stylus 102 to be clipped to an apron or shirt of a server. In addition, clip 224 may serve as an antenna for use in wireless communications.

Magnetic stripe reader module 204 may be connected to body 202 via a USB connection 226. USB connection 224 may allow the magnetic stripe reader and other components that may be housed within magnetic stripe reader module 204 to be in electrical communication with the processor located within body 202. In addition, a magnet 226 may be used to help secure magnetic stripe reader 204 to body 202 as described above.

Just as with USB connection 220, USB connection 230 may allow stylus 102 to connect with computing device 104 and may allow for programming and other data transfer between stylus 102 and computing device 104. In addition, USB connection 230 may allow batteries located within body 202 to be recharged.

Control knob 206 may be connected to magnetic stripe reader module 204 or may be connected directly to body 202. Control knob 206 may be connected to stripe reader module 204 via a USB connection 230 as describe above with regards to USB connection 226. Control knob 206 may be operative to cycle through and select digital menu items that may be displayed on display 212. For example, control knob 206 may include a rotational portion 232 that may allow a user to cycle through menu options by rotating rotational portion 232. To select a menu item a user may press a button (not shown) to select the menu item.

Figure 3:
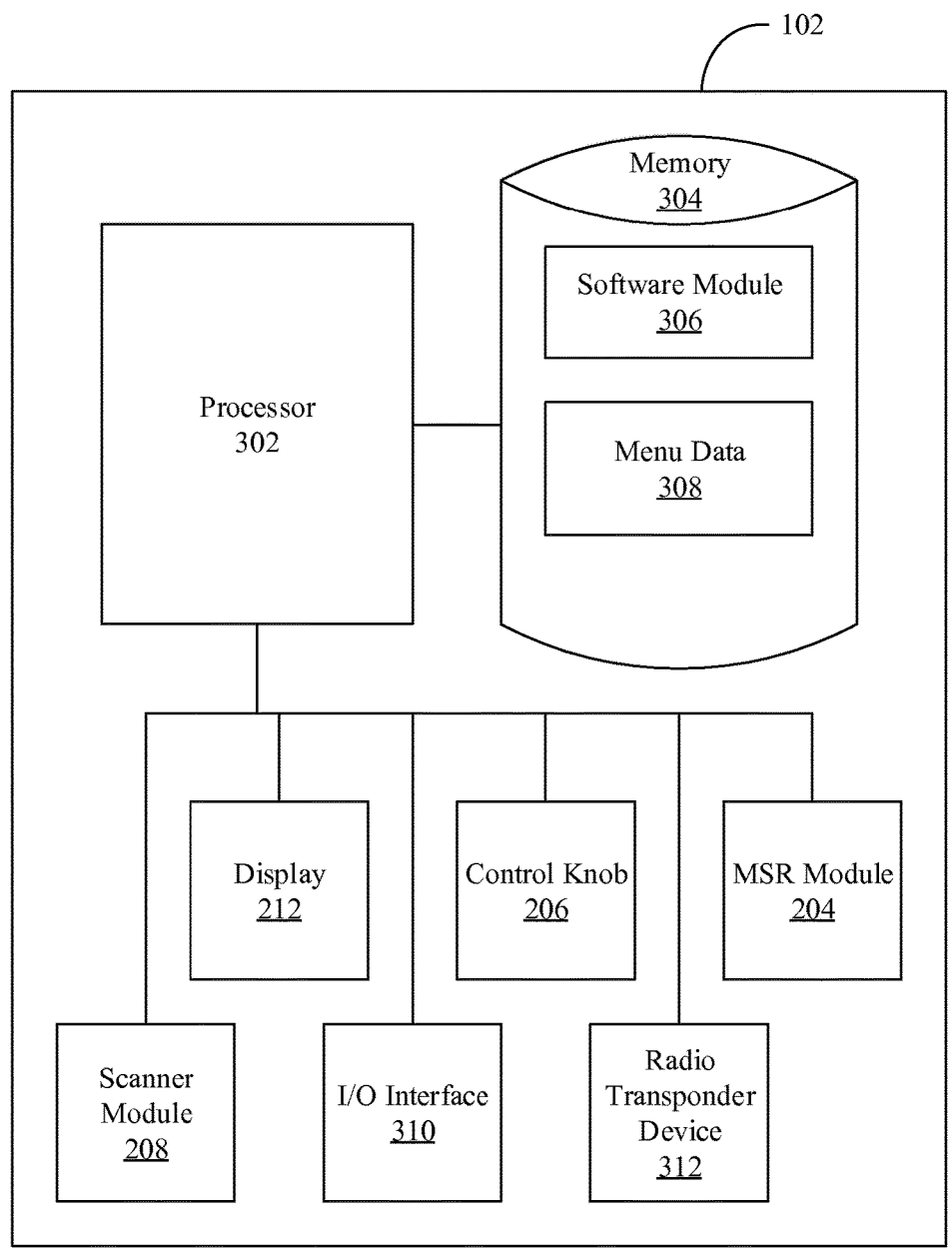
FIG. 3 shows an example schematic of a stylus consistent with embodiments disclosed herein.

FIG. 3 shows a schematic of stylus 102 consistent with embodiments disclosed herein. As shown in FIG. 3, stylus 102 may include a processor 302 and a memory unit 304. Memory unit 304 may include a software module 306 and menu data 308. While executing on processor 302, software module 304 may perform processes for processing an order, including, for example, one or more stages included in method 400 described below with respect to FIG. 4.

Menu data 308 may include information about the various items printed on printed menu 106. For example, menu data 308 may include prices of the menu items, descriptions of the menus, and a product identifier. In addition, the menu data 308 may include the coordinates of the various items printed on printed menu 106. During operation, processor 302 may use the coordinates to locate the information about the various menu items. In other words, the coordinates may act as a pointer to a location within memory 304 to where the information about the various menu items may be stored.

Stylus 102 may also include an input/output (I/O) device 310. I/O device 310 may allow stylus 102 to receive and output information. Non-limiting examples of I/O device 310 include, USB connections 220, 230, and 232.

Stylus 102 may also include a radio transponder device 312. Radio transponder device 312 may allow stylus 102 to transmit and receive data. For example, radio transponder device 312 may allow stylus 102 to wirelessly communicate with computing device 104 as described herein.

Figure 4:
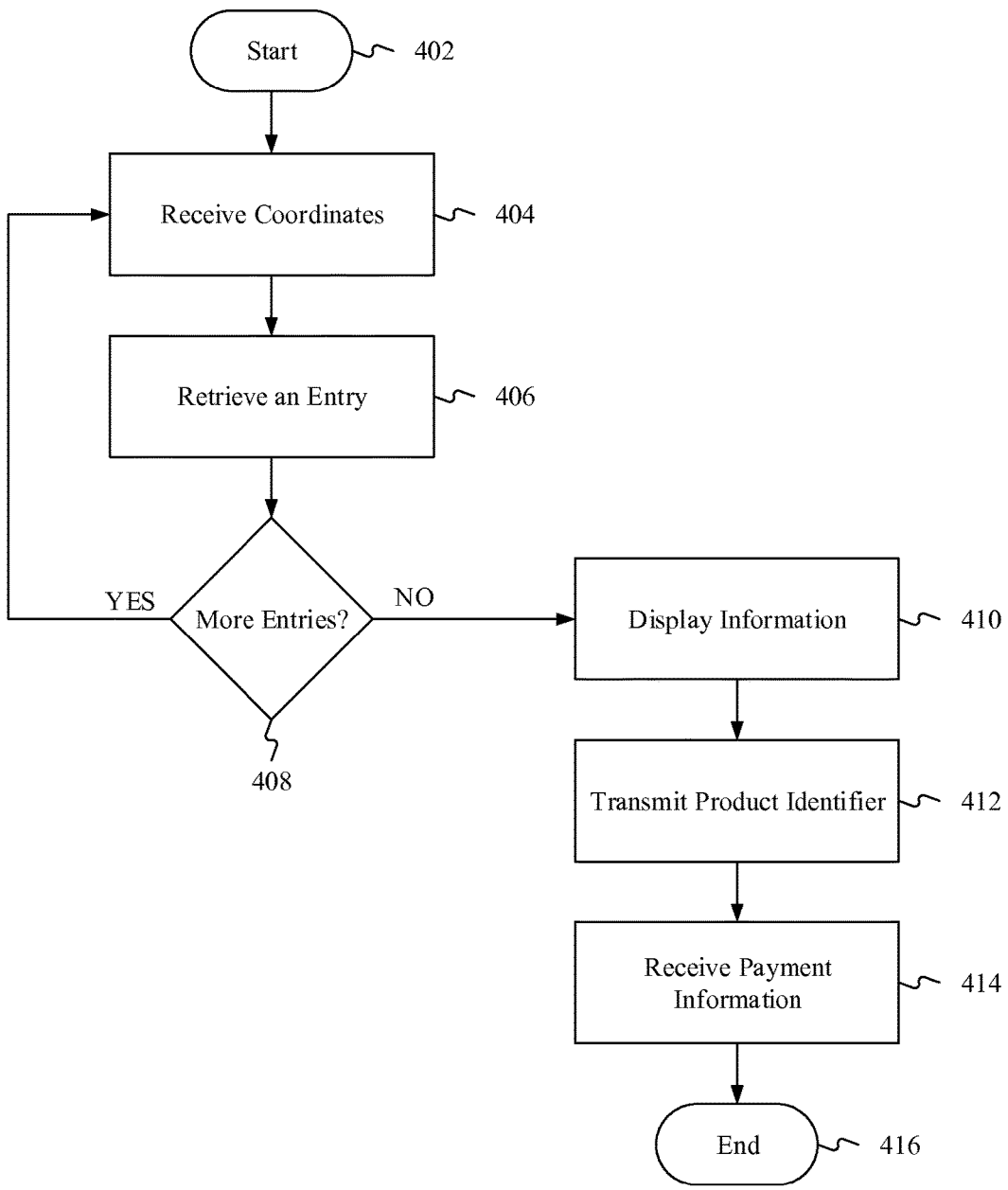
FIG. 4 shows an example method for processing an order using a stylus consistent with embodiments disclosed herein.

FIG. 4 shows an example method 400 for processing an order using stylus 102 consistent with embodiments disclosed herein. Method 400 may begin at stage 402 and may proceed to stage 404 where processor 302 may receive coordinates. For example, a user may point stylus 102 at printed menu 106. The scanner may scan a code on printed menu 106 and the coordinates may be received by processor 302. As discussed herein, the scanner may read a printed code, receiving information from a RFID tag, etc. The coordinates received by processor 302 may correspond to a location of a menu item on the printed menu.

From stage 404 method 400 may proceed to stage 406 where processor 302 may retrieve an entry. For example, processor 302 may use the received coordinates to retrieve an entry stored in memory 304 corresponding to a menu item.

From stage 406 method 400 may proceed to decision block 408. At decision block 408 a determination can be made as to if additional entries need to be retrieved. In other words, if a customer wants to order more menu items, method 400 may proceed to stage 404 where additional coordinates may be received. The determination as to whether a customer wishes to order more items may be by pressing a button on control knob 206.

If the customer does not want to order more menu items, method 400 may proceed to stage 410 where information regarding the customer's order may be displayed on display 212. For example, after a customer finish his or her order, a server may use control knob 206 to cycle through the various menu items the customer requested. As the server cycles through the various menu items information about the various menu items may be displayed on display 212 and read back to the customer.

After displaying the information about the various menu items, method 400 may proceed to stage 412 where processor 302 may transmit product identifiers retrieved with the entries in stage 406 to computing device 104. For example, stylus 102 may be used to record the customer's order, but before the order can be completed, the order may need to be transmitted to kitchen staff or a point of sale device.

From stage 412 method 400 may proceed to stage 414 where payment information may be received. For example, after a customer has finished a meal, a server may use magnetic stripe reader module 204 to swipe the customer's credit or debit card. In addition, the server may use scanner module 208 to capture an image of the customer's credit or debit card. Processor 302 may use the image to extract payment information such as the credit or debit card number and expiration date. In addition, a server may directly enter the payment information using display 212, control knob 206, or a combination thereof. From stage 414 method 400 may terminate at stage 416.

While method 400 has been described with respect to stylus 102, various stages of method 400 can be implemented by computing device 104. For example, stylus 102 may be used to scan printed menu 106, and transmit coordinates to computing device 104. In other words, computing device 104 may receive coordinates (stage 402) from stylus 102. Computing device 104 may retrieve an entry (stage 406) as described above. Information regarding the various menu items may be displayed on a display of computing device (stage 410). Computing device 104 may also receive the payment information (stage 414). For example, the payment information may be directly entered into computing device or stylus 102 may transmit the payment information to computing device 104.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A stylus comprising:
    a body having an outer surface and a first and second end, the outer surface defining a volume containing a processor and a memory;
    a display proximate the outer surface and in electrical communication with the processor;
    a scanner module in electrical communication with the processor and proximate the first end, the scanner module including a scanner, a control knob in electrical communication with the processor and proximate either the first or second end, the control knob operative to cycle through and select digital menu options displayed on the display;
    a clip including an end portion for abutting either the first or the second end of the body, the clip comprising a shaft portion for orientation adjacent the outer surface, the clip configured for securing the stylus to an article of clothing;
    wherein the shaft portion further comprises a magnetic stripe reader module in electrical communication with the processor, the magnetic stripe reader module comprising a magnetic stripe reader.

2. The stylus of claim 1, wherein the scanner module further includes a writing pen.

3. The stylus of claim 1, wherein the scanner module in electrical communication with the processor includes the scanner module connected to the body via a USB connection and the scanner module secured to the body via a magnet located at the first end or the scanner module.

4. The stylus of claim 1, wherein the scanner is configured to scan at least one of a barcode, an ink visible in either a UV or an IR spectrum, a Quick Response (QR) code printed on a printed menu or a Radio Frequency Identification (REID) tag embedded within the printed menu.

5. The stylus of claim 1, wherein the scanner module includes a magnification lens positioned between the scanner and, when in use, micro-printed text printed on a printed menu to magnify light impinging on the scanner.

6. The stylus of claim 1, further comprising a radio transponder device located within the volume, the transmitter configured to transmit signals with data encoded therein via a Wi-Fi or Bluetooth connection.

7. The stylus of claim 1, wherein the memory stores a plurality of entries, each of the plurality of entries containing information regarding a menu on a printed menu, wherein the information regarding the menu item includes a price of the menu item, a description of the menu item, and a product identifier.

8. The stylus of claim 1,
    wherein the processor is operative to:
        receive, from the scanner, coordinates that correspond to a location on a printed menu, and
        retrieve an entry associated with a menu item associated with the location on the printed menu using the coordinates, wherein the coordinates act as a pointer to the entry stored in the memory of the stylus,
    wherein the display is operative to display the entry associated with the menu item.

* * * * *